(12) United States Patent
Richards

(10) Patent No.: US 7,921,442 B2
(45) Date of Patent: Apr. 5, 2011

(54) METHOD AND APPARATUS FOR SIMULTANEOUS LIVE TELEVISION AND DATA SERVICES USING SINGLE BEAM ANTENNAS

(75) Inventor: William R. Richards, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 2044 days.

(21) Appl. No.: 10/324,161

(22) Filed: Dec. 19, 2002

(65) Prior Publication Data

US 2003/0097658 A1 May 22, 2003

Related U.S. Application Data

(63) Continuation of application No. 09/639,912, filed on Aug. 16, 2000.

(60) Provisional application No. 60/396,885, filed on Jul. 17, 2002.

(51) Int. Cl.
*H04N 7/18* (2006.01)

(52) U.S. Cl. ............ 725/76; 725/75; 455/431; 455/427; 370/316

(58) Field of Classification Search .............. 725/64–71, 725/75–77; 455/12.1, 13.3–13.11, 427–431, 455/463, 562; 370/316–320, 323, 347
See application file for complete search history.

(56) References Cited

U.S. PATENT DOCUMENTS

| | | | |
|---|---|---|---|
| 3,972,045 A | 7/1976 | Perret | |
| 4,392,139 A | 7/1983 | Aoyama et al. | |
| 4,743,906 A | 5/1988 | Fullerton | |
| 4,866,515 A | 9/1989 | Tagawa et al. | |
| 4,901,307 A | 2/1990 | Gilhousen et al. | |
| 4,939,527 A | 7/1990 | Lamberty | |
| 4,958,381 A | 9/1990 | Toyoshima | |
| 5,027,124 A | 6/1991 | Fitzsimmons | |
| 5,127,021 A | 6/1992 | Schreiber | |
| 5,136,304 A | 8/1992 | Peters | |
| 5,146,234 A | 9/1992 | Lalezari | |
| 5,230,076 A | 7/1993 | Wilkinson | |

(Continued)

FOREIGN PATENT DOCUMENTS

| | | |
|---|---|---|
| EP | 0577054 A1 | 1/1994 |
| EP | 1096699 | 5/2001 |
| EP | 1209928 | 5/2002 |

(Continued)

OTHER PUBLICATIONS

Boeing Phased Array Antenna Installed on Business Jet, Boeing Press Release, Nov. 7, 1996, (1 pg).
Vertatschitsch et al., Boeing Satellite Television Airplane Receiving System (STARS) Performance, International Mobile Satellite Conference, Ottawa—1995, (5 pgs).

(Continued)

*Primary Examiner* — Annan Q Shang
(74) *Attorney, Agent, or Firm* — Toler Law Group

(57) ABSTRACT

A method and apparatus are provided for simultaneously receiving DBS and data signals on a mobile platform using a single beam receive antenna aperture and transmitting data signals from a mobile platform using the single beam transmit antenna aperture. A single beam receive antenna aperture receives first RF signals having a first polarization and second RF signals having a second polarization, the single beam receive antenna aperture outputting output signals having the first polarization. A first RF converter down-converts the output signals to first down-converted signals having the first polarization. A second RF converter down-converts the output signals to second down-converted signals having the second polarization. The first RF signals suitably include DBS signals, and the second RF signals suitably include data services signals.

25 Claims, 3 Drawing Sheets

U.S. PATENT DOCUMENTS

| | | | |
|---|---|---|---|
| 5,249,303 | A | 9/1993 | Goeken |
| 5,276,455 | A | 1/1994 | Fitzsimmons |
| 5,285,470 | A | 2/1994 | Schreiber |
| 5,289,272 | A | 2/1994 | Rabowsky et al. |
| 5,311,302 | A | 5/1994 | Berry et al. |
| 5,313,457 | A | 5/1994 | Hostetter et al. |
| 5,463,656 | A * | 10/1995 | Polivka et al. ............ 375/130 |
| 5,473,601 | A * | 12/1995 | Rosen et al. ............... 370/319 |
| 5,485,485 | A * | 1/1996 | Briskman et al. ............ 375/130 |
| 5,488,380 | A | 1/1996 | Harvey |
| 5,495,258 | A | 2/1996 | Muhlhauser et al. |
| 5,524,272 | A | 6/1996 | Podowski et al. |
| 5,537,679 | A | 7/1996 | Crosbie et al. |
| 5,543,805 | A | 8/1996 | Thaniyavarn |
| 5,555,466 | A | 9/1996 | Scribner et al. |
| 5,568,484 | A | 10/1996 | Margis |
| 5,583,735 | A | 12/1996 | Pease et al. |
| 5,592,539 | A | 1/1997 | Amarant et al. |
| 5,751,248 | A | 5/1998 | Thaniyavarn |
| 5,760,819 | A | 6/1998 | Sklar et al. |
| 5,761,602 | A | 6/1998 | Wagner et al. |
| 5,761,606 | A | 6/1998 | Wolzien |
| 5,790,175 | A | 8/1998 | Sklar et al. |
| 5,801,751 | A | 9/1998 | Sklar et al. |
| 5,812,947 | A * | 9/1998 | Dent ............................ 455/427 |
| 5,835,487 | A | 11/1998 | Campanella |
| 5,861,856 | A | 1/1999 | Beele et al. |
| 5,867,490 | A | 2/1999 | Campanella |
| 5,886,671 | A | 3/1999 | Riemer |
| 5,973,647 | A | 10/1999 | Barrett et al. |
| 5,974,349 | A | 10/1999 | Levine |
| 5,990,928 | A * | 11/1999 | Sklar et al. ..................... 725/72 |
| 6,018,659 | A | 1/2000 | Ayyagari et al. |
| 6,020,848 | A | 2/2000 | Wallace |
| 6,023,242 | A | 2/2000 | Dixon |
| 6,028,562 | A * | 2/2000 | Guler et al. ................... 343/771 |
| 6,034,634 | A * | 3/2000 | Karlsson et al. .............. 342/359 |
| 6,047,165 | A | 4/2000 | Wright et al. |
| 6,061,387 | A * | 5/2000 | Yi .................................. 375/142 |
| 6,061,562 | A | 5/2000 | Martin et al. |
| 6,078,297 | A | 6/2000 | Kormanyos |
| 6,078,577 | A | 6/2000 | Bishop et al. |
| 6,104,914 | A | 8/2000 | Wright et al. |
| 6,108,523 | A | 8/2000 | Wright et al. |
| 6,122,261 | A * | 9/2000 | Fernandes et al. ............. 370/320 |
| 6,137,377 | A | 10/2000 | Wallace |
| 6,167,286 | A * | 12/2000 | Ward et al. ................. 455/562.1 |
| 6,175,717 | B1 | 1/2001 | Rebec et al. |
| 6,198,449 | B1 * | 3/2001 | Muhlhauser et al. .......... 343/753 |
| 6,204,822 | B1 * | 3/2001 | Cardiasmenos et al. ...... 343/761 |
| 6,208,307 | B1 | 3/2001 | Frisco et al. |
| 6,229,844 | B1 * | 5/2001 | Kong ............................. 375/150 |
| 6,249,913 | B1 | 6/2001 | Galipeau et al. |
| 6,271,728 | B1 | 8/2001 | Wallace |
| 6,327,063 | B1 * | 12/2001 | Rockwell ....................... 398/122 |
| 6,339,611 | B1 * | 1/2002 | Antonio et al. ................ 375/130 |
| 6,347,001 | B1 * | 2/2002 | Arnold et al. .................. 398/122 |
| 6,351,247 | B1 | 2/2002 | Linstrom |
| 6,356,235 | B2 | 3/2002 | Laidig et al. |
| 6,356,239 | B1 | 3/2002 | Carson |
| 6,384,778 | B1 | 5/2002 | Campbell |
| 6,400,315 | B1 | 6/2002 | Adler |
| 6,411,824 | B1 * | 6/2002 | Eidson ........................... 455/561 |
| 6,414,644 | B1 | 7/2002 | Desargant |
| 6,417,803 | B1 | 7/2002 | De La Chapelle |
| 6,424,313 | B1 | 7/2002 | Navarro |
| 6,438,468 | B1 | 8/2002 | Muxlow et al. |
| 6,477,152 | B1 | 11/2002 | Hiett |
| 6,483,458 | B1 | 11/2002 | Carson |
| 6,483,474 | B1 | 11/2002 | Desargant |
| 6,489,745 | B1 | 12/2002 | Koreis |
| 6,504,093 | B1 | 1/2003 | Cawley |
| 6,507,956 | B1 * | 1/2003 | Kronenbeger ................. 2/195.1 |
| 6,512,486 | B1 | 1/2003 | Desargant |
| 6,513,755 | B1 | 2/2003 | Lambiaso |
| 6,513,756 | B1 | 2/2003 | Lambiaso |
| 6,518,853 | B1 | 2/2003 | O'Connell |
| 6,527,227 | B1 | 3/2003 | Lambiaso |
| 6,527,566 | B1 | 3/2003 | Lambiaso |
| 6,529,706 | B1 | 3/2003 | Mitchell |
| 6,542,129 | B1 | 4/2003 | Bien |
| 6,553,239 | B1 * | 4/2003 | Langston .................... 455/562.1 |
| 6,563,047 | B2 | 5/2003 | Lambiaso |
| 6,570,540 | B2 | 5/2003 | Desargant |
| 6,574,338 | B1 | 6/2003 | Sachdev |
| 6,580,402 | B2 | 6/2003 | Navarro |
| 6,601,798 | B2 | 8/2003 | Cawley |
| 6,606,055 | B2 | 8/2003 | Halsema et al. |
| 6,606,056 | B2 | 8/2003 | Brogden |
| 6,608,596 | B2 | 8/2003 | Bien |
| 6,615,642 | B2 | 9/2003 | Poblete |
| 6,619,588 | B2 | 9/2003 | Lambiaso |
| 6,626,275 | B2 | 9/2003 | Lee |
| 6,628,235 | B2 | 9/2003 | Wight |
| 6,628,919 | B1 * | 9/2003 | Curello et al. ................ 455/12.1 |
| 6,629,581 | B2 | 10/2003 | Lambiaso |
| 6,633,266 | B2 | 10/2003 | Blen |
| 6,634,904 | B2 | 10/2003 | Rowland |
| 6,642,905 | B2 | 11/2003 | Bien |
| 6,643,274 | B2 | 11/2003 | D'Annunzio |
| 6,643,510 | B2 | 11/2003 | Taylor |
| 6,644,593 | B2 | 11/2003 | Lambiaso |
| 6,652,313 | B2 | 11/2003 | Lambiaso |
| 6,659,319 | B2 | 12/2003 | Purpura |
| 6,661,388 | B2 | 12/2003 | Desargant |
| 6,670,930 | B2 | 12/2003 | Navarro |
| 6,670,931 | B2 | 12/2003 | O'Connell |
| 6,674,000 | B2 | 1/2004 | Lambiaso |
| 6,674,339 | B2 | 1/2004 | Kormanyos |
| 6,674,398 | B2 | 1/2004 | Murphy |
| 6,680,711 | B2 | 1/2004 | Desargant |
| 6,694,137 | B2 * | 2/2004 | Sharon .......................... 455/427 |
| 6,703,974 | B2 | 3/2004 | White |
| 6,707,346 | B2 | 3/2004 | Tillotson |
| 6,708,019 | B2 | 3/2004 | McLain |
| 6,714,163 | B2 | 3/2004 | Navarro |
| 6,717,552 | B2 | 4/2004 | Desargant |
| 6,728,535 | B2 | 4/2004 | Parkman |
| 6,731,909 | B2 | 5/2004 | McLain |
| 6,741,141 | B2 | 5/2004 | Kormanyos |
| 6,741,841 | B1 | 5/2004 | Mitchell |
| 6,747,960 | B2 | 6/2004 | Tillotson |
| 6,751,442 | B1 | 6/2004 | Barrett |
| 6,754,230 | B2 | 6/2004 | Purpura |
| 6,755,663 | B2 | 6/2004 | Lee |
| 6,757,535 | B2 | 6/2004 | Parkman |
| 6,757,712 | B1 | 6/2004 | Bastian et al. |
| 6,768,715 | B2 | 7/2004 | Hsu et al. |
| 6,771,608 | B2 | 8/2004 | Tillotson |
| 6,778,825 | B2 | 8/2004 | Parkman |
| 6,782,392 | B1 | 8/2004 | Weinberger et al. |
| 6,785,526 | B2 | 8/2004 | McLain |
| 6,796,473 | B2 | 9/2004 | Purpura |
| 6,796,495 | B2 | 9/2004 | Stahl |
| D497,586 | S | 10/2004 | Ferguson |
| 6,801,764 | B2 | 10/2004 | Purpura |
| 6,807,396 | B2 * | 10/2004 | Horie et al. ................... 455/3.02 |
| 6,807,538 | B1 | 10/2004 | Weinberger et al. |
| 6,810,527 | B1 | 10/2004 | Conrad et al. |
| 6,811,121 | B2 | 11/2004 | Lambiaso |
| 6,812,903 | B1 * | 11/2004 | Sievenpiper et al. ......... 343/753 |
| 6,817,894 | B2 | 11/2004 | Sanner |
| 6,823,719 | B2 | 11/2004 | Poblete |
| 6,826,029 | B2 | 11/2004 | Purpura |
| 6,835,068 | B2 | 12/2004 | Pappas |
| 6,843,681 | B2 | 1/2005 | Sanner |
| 6,844,855 | B2 | 1/2005 | Carson |
| 6,847,801 | B2 | 1/2005 | De La Chapelle |
| 6,856,295 | B2 | 2/2005 | Desargant |
| 6,860,554 | B2 | 3/2005 | Lambiaso |
| 6,861,994 | B2 | 3/2005 | Desargant |
| 6,862,000 | B2 | 3/2005 | Desargant |
| 6,863,246 | B2 | 3/2005 | Kane et al. |
| 6,885,863 | B2 | 4/2005 | Parkman |
| 6,899,390 | B2 | 5/2005 | Sanford |
| 6,907,332 | B1 | 6/2005 | Huynh |
| 6,914,781 | B2 | 7/2005 | Rotta |

| | | | | | | |
|---|---|---|---|---|---|---|
| 6,919,852 B2 | 7/2005 | Desargant | | 7,734,740 B2 | 6/2010 | To |
| 6,927,334 B2 | 8/2005 | Lambiaso | | 7,751,337 B2 | 7/2010 | McLain |
| 6,934,059 B2 | 8/2005 | Lundgren | | 7,769,398 B2 | 8/2010 | Marston |
| 6,940,978 B2 | 9/2005 | Parkman | | 2002/0087992 A1 | 7/2002 | Bengeult et al. |
| 6,941,111 B2 | 9/2005 | McLain | | 2002/0152470 A1 | 10/2002 | Hammond |
| 6,946,990 B2 | 9/2005 | Monk | | 2002/0159399 A1 | 10/2002 | Stephenson |
| 6,947,726 B2 | 9/2005 | Rockwell | | 2002/0160773 A1 | 10/2002 | Gresham |
| 6,947,733 B2 | 9/2005 | Tillotson | | 2003/0003872 A1 | 1/2003 | Brinkley |
| 6,954,620 B2 | 10/2005 | Rotta | | 2003/0039261 A1 | 2/2003 | Purpura |
| 6,959,168 B2 | 10/2005 | Parkman | | 2003/0045285 A1 | 3/2003 | Parkman |
| 6,963,304 B2 | 11/2005 | Murphy | | 2003/0046701 A1 | 3/2003 | O'Donnell |
| 6,965,851 B2 | 11/2005 | Tillotson | | 2003/0047342 A1 | 3/2003 | Rotta |
| 6,973,518 B2 | 12/2005 | Purpura | | 2003/0097658 A1 | 5/2003 | Richards |
| 6,975,616 B2 | 12/2005 | Stephenson | | 2003/0099218 A1 | 5/2003 | Tillotson |
| 6,980,546 B2 | 12/2005 | Purpura | | 2003/0144579 A1 | 7/2003 | Buss |
| 6,985,942 B2 | 1/2006 | D'Annunzio | | 2003/0187554 A1 | 10/2003 | Henry |
| 6,989,791 B2 | 1/2006 | Navarro | | 2003/0208579 A1 | 11/2003 | Brady, Jr. |
| 6,990,338 B2 | 1/2006 | Miller | | 2003/0211829 A1 | 11/2003 | De La Chapelle |
| 6,993,288 B2 | 1/2006 | de La Chapelle | | 2003/0225492 A1 | 12/2003 | Cope |
| 6,993,554 B2 | 1/2006 | O'Donnell | | 2004/0004130 A1 | 1/2004 | Rotta |
| 7,003,293 B2 | 1/2006 | D'Annunzio | | 2004/0014357 A1 | 1/2004 | Madera |
| 7,023,996 B2 | 4/2006 | Stephenson | | 2004/0036648 A1 | 2/2004 | Carson |
| 7,027,767 B2 | 4/2006 | De La Chapelle | | 2004/0106404 A1 | 6/2004 | Gould |
| 7,036,889 B2 | 5/2006 | Sanford | | 2004/0129826 A1 | 7/2004 | Lambiaso |
| 7,042,409 B2 | 5/2006 | Desargant | | 2004/0158794 A1 | 8/2004 | Niesen |
| 7,054,322 B2 | 5/2006 | D'Annunzio | | 2004/0176887 A1 | 9/2004 | Kent |
| 7,054,593 B2 | 5/2006 | De La Chapelle | | 2004/0203803 A1 | 10/2004 | Taylor |
| 7,068,615 B2 | 6/2006 | Niesen | | 2004/0229607 A1 | 11/2004 | De La Chapelle |
| 7,072,634 B2 | 7/2006 | Tillotson | | 2004/0235469 A1 | 11/2004 | Krug |
| 7,080,116 B2 | 7/2006 | Purpura | | 2005/0065682 A1 | 3/2005 | Kapadia |
| 7,085,288 B2 | 8/2006 | Taylor | | 2005/0288975 A1 | 4/2005 | O'Byrne |
| 7,085,563 B2 | 8/2006 | Parkman | | 2005/0136917 A1 | 6/2005 | Taylor |
| 7,090,127 B2 | 8/2006 | Rotta | | 2005/0171653 A1 | 8/2005 | Taylor |
| 7,099,331 B2 | 8/2006 | Taylor | | 2005/0175119 A1 | 8/2005 | Worley |
| 7,099,665 B2 | 8/2006 | Taylor | | 2005/0221818 A1 | 10/2005 | Johnson |
| 7,119,700 B2 | 10/2006 | Rotta | | 2005/0223317 A1 | 10/2005 | Byrer |
| 7,120,389 B2 | 10/2006 | De La Chapelle | | 2005/0232185 A1 | 10/2005 | Hudson |
| 7,123,199 B2 | 10/2006 | Rotta | | 2005/0234788 A1 | 10/2005 | Hudson |
| 7,127,683 B2 | 10/2006 | Royalty | | 2005/0240774 A1 | 10/2005 | Angus |
| 7,129,903 B2 | 10/2006 | Desargant | | 2005/0254654 A1 | 11/2005 | Rockwell |
| 7,136,621 B2 | 11/2006 | De La Chapelle | | 2005/0267653 A1 | 12/2005 | Matsushita |
| 7,139,258 B2 | 11/2006 | Tillotson | | 2005/0278768 A1 | 12/2005 | Boyer |
| 7,139,346 B2 | 11/2006 | Skahan, Jr. | | 2005/0281223 A1 | 12/2005 | D'Annunzio |
| 7,142,812 B1 | 11/2006 | Brankovic et al. | | 2005/0289178 A1 | 12/2005 | Angus |
| 7,154,859 B2 | 12/2006 | Purpura | | 2006/0006287 A1 | 1/2006 | Ferguson |
| 7,155,168 B2 | 12/2006 | McLain | | 2006/0031394 A1 | 2/2006 | Tazuma |
| 7,171,197 B2 | 1/2007 | Miller | | 2006/0061506 A1 | 3/2006 | Murphy |
| 7,187,690 B2 | 3/2007 | Taylor | | 2006/0100935 A1 | 5/2006 | Klawitter |
| 7,231,881 B2 | 6/2007 | Nelson | | 2006/0154601 A1 | 7/2006 | Tewalt |
| 7,242,931 B2 | 7/2007 | Leuca | | 2006/0198326 A1 | 9/2006 | Yang |
| 7,248,841 B2 * | 7/2007 | Agee et al. ............ 455/101 | | 2006/0229070 A1 | 10/2006 | De La Chapelle |
| 7,250,915 B2 | 7/2007 | Nelson | | 2006/0229076 A1 | 10/2006 | Monk |
| 7,256,749 B2 | 8/2007 | DeSargant | | 2006/0229077 A1 | 10/2006 | Monk |
| 7,274,336 B2 | 9/2007 | Carson | | 2006/0229104 A1 | 10/2006 | De La Chapelle |
| 7,295,165 B2 | 11/2007 | Ferguson | | 2006/0270354 A1 | 11/2006 | De La Chapelle |
| 7,299,013 B2 | 11/2007 | Rotta | | 2006/0270470 A1 | 11/2006 | De La Chapelle |
| 7,302,226 B2 | 11/2007 | Stephenson | | 2007/0022097 A1 | 1/2007 | Tewalt |
| 7,321,383 B2 | 1/2008 | Monagahn | | 2007/0027589 A1 | 2/2007 | Brinkley |
| 7,328,011 B2 | 2/2008 | Fagan | | 2007/0055434 A1 | 3/2007 | Kohlmann |
| 7,346,036 B2 | 3/2008 | Fagan | | 2007/0127460 A1 | 6/2007 | Wilber |
| 6,567,729 B2 | 4/2008 | Betters et al. | | 2007/0275659 A1 | 11/2007 | Parkman |
| 7,362,262 B2 | 4/2008 | Murphy | | 2009/0077265 A1 | 3/2009 | Brinkley |
| 7,382,327 B2 | 6/2008 | Nelson | | | | |
| 7,414,573 B2 | 8/2008 | Murphy | | | | |
| 7,418,261 B2 | 8/2008 | Forbes | | | | |
| 7,437,125 B2 | 10/2008 | McLain | | | | |
| 7,440,451 B2 | 10/2008 | Letney | | | | |
| 7,450,901 B2 | 11/2008 | Parkman | | | | |
| 7,454,202 B2 | 11/2008 | De La Chapelle | | | | |
| 7,493,414 B2 | 2/2009 | Tazuma | | | | |
| 7,508,342 B2 | 3/2009 | Nelson | | | | |
| 7,583,684 B2 | 9/2009 | Cheng | | | | |
| 7,587,474 B2 | 9/2009 | O'Donnell | | | | |
| 7,599,691 B1 | 10/2009 | Mitchell | | | | |
| 7,630,683 B2 | 12/2009 | De La Chapelle | | | | |
| 7,636,552 B2 | 12/2009 | Monk | | | | |
| 7,643,441 B2 | 1/2010 | De La Chapelle | | | | |
| 7,715,819 B2 | 5/2010 | Rockwell | | | | |
| 7,715,854 B2 | 5/2010 | Bogart | | | | |

FOREIGN PATENT DOCUMENTS

| | | |
|---|---|---|
| WO | WO 9424773 A1 | 10/1994 |
| WO | WO 0014987 A1 | 3/2000 |
| WO | WO 0197433 | 12/2001 |
| WO | WO 02/15582 A1 | 2/2002 |
| WO | WO 02/27975 A1 | 4/2002 |

OTHER PUBLICATIONS

Raby et al., Ku-Band Transmit Phased Array Antenna for use in FSS Communication Systems, IEEE, 2000 (pp. 227-230).

Bengeult et al., Method and apparatus for providing bi-directional data services and live television programming to mobile platforms, U.S. Appl. No. 09/639,912, Aug. 16, 2000 (40 pgs).

* cited by examiner

METHOD AND APPARATUS FOR SIMULTANEOUS LIVE TELEVISION AND DATA SERVICES USING SINGLE BEAM ANTENNAS

PRIORITY CLAIM

This application claims priority from U.S. Patent Application No. 60/396,885 filed on Jul. 17, 2002. This application is also related to U.S. patent application Ser. No. 09/989,742 filed on Nov. 20, 2001 and U.S. patent application Ser. No. 09/639,912 filed on Aug. 16, 2000. The disclosures of all the above applications are hereby incorporated by reference.

FIELD OF THE INVENTION

This invention relates to worldwide systems for supplying live television programming and bi-directional data services to mobile platforms, such as aircraft, using satellite communication.

BACKGROUND OF THE INVENTION

Broadband data and video services, on which our society and economy have grown to depend, have heretofore generally not been readily available to users on board mobile platforms such as aircraft, ships, trains, automobiles, etc. While the technology exists to deliver such services to all forms of mobile platforms, past solutions have been generally quite expensive, low data rate and/or available to only very limited markets of government/military users and some high-end maritime markets (i.e., cruise ships).

At present, a wide variety of broadcast television (TV) services are available to terrestrial users via satellite links. Such services include commercial Direct Broadcast Satellite (DBS) services (such as DirecTV® and EchoStar®) and custom video, such as rebroadcast video, over private Fixed Satellite Services (FSS) or Broadcast Satellite Services (BSS) satellites. The data services which can be provided via satellite link include all conventional Internet services (e.g., email, web browsing, NetMeeting, etc.), as well as virtual private networks (VPNs) for corporate and government customers.

Previously developed systems which have attempted to provide live TV and data services to mobile platforms have done so with only limited success. One major obstacle has been the high cost of access to such broadband data and video services. Another problem is the limited capacity of previously developed systems, which is insufficient for mobile platforms carrying dozens, or even hundreds, of individuals who each may be simultaneously requesting different channels of programming or different data services. Furthermore, presently existing systems are generally not readily scalable to address the demands of the traveling public.

Certain services currently available provide a limited subset of the above described services. One such service provides a narrow-bandwidth Internet connection to users on a mobile platform. Another service provides either TV broadcast services from available direct broadcast signals (i.e., EchoStar® and DirectTV®) or provides a custom TV broadcast signal through dedicated satellite links (i.e., Airshow®).

Advances made by ConneXion by Boeing® have made possible high speed (i.e., greater than 64 Kbps) bidirectional data networking services to groups of users on mobile or remote platforms together with video services, such as live television or rebroadcast video, via one or more satellite links. More specifically, this system provides Internet data communication, Direct Broadcast Satellite Services via BSS satellites, and rebroadcast video of live television programming via Ku or Ka-band satellites to a plurality of users onboard one or more mobile platforms, and in a manner which allows each user to request and receive Internet or other forms of real time data, as well specific live programming which he/she desires to view.

However, it would be desirable to provide simultaneous live television reception and data reception on a mobile platform using a single beam receive antenna aperture and data transmit services from a mobile platform using a single beam transmit antenna aperture.

SUMMARY OF THE INVENTION

The present invention provides a method and apparatus for providing simultaneous live television and data services to a mobile platform using a single beam antenna.

Embodiments of the method and apparatus of the present invention provide an ability to simultaneously receive live television signals, such as DBS signals, and data signals on a mobile platform using a single beam receive antenna aperture and transmit data signals from a mobile platform using a single beam transmit antenna aperture. A single beam receive antenna aperture receives first RF signals having a first polarization and second RF signals having a second polarization, the single beam receive antenna aperture outputting output signals having the first polarization. A first RF converter down-converts the output signals to first down-converted signals having the first polarization. A second RF converter down-converts the output signals to second down-converted signals having the second polarization. The first RF signals suitably include live television signals such as DBS signals, and the second RF signals suitably include data services signals. The first polarization suitably includes circular polarization and the second polarization suitably includes linear polarization.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE INVENTION

Figure 3:
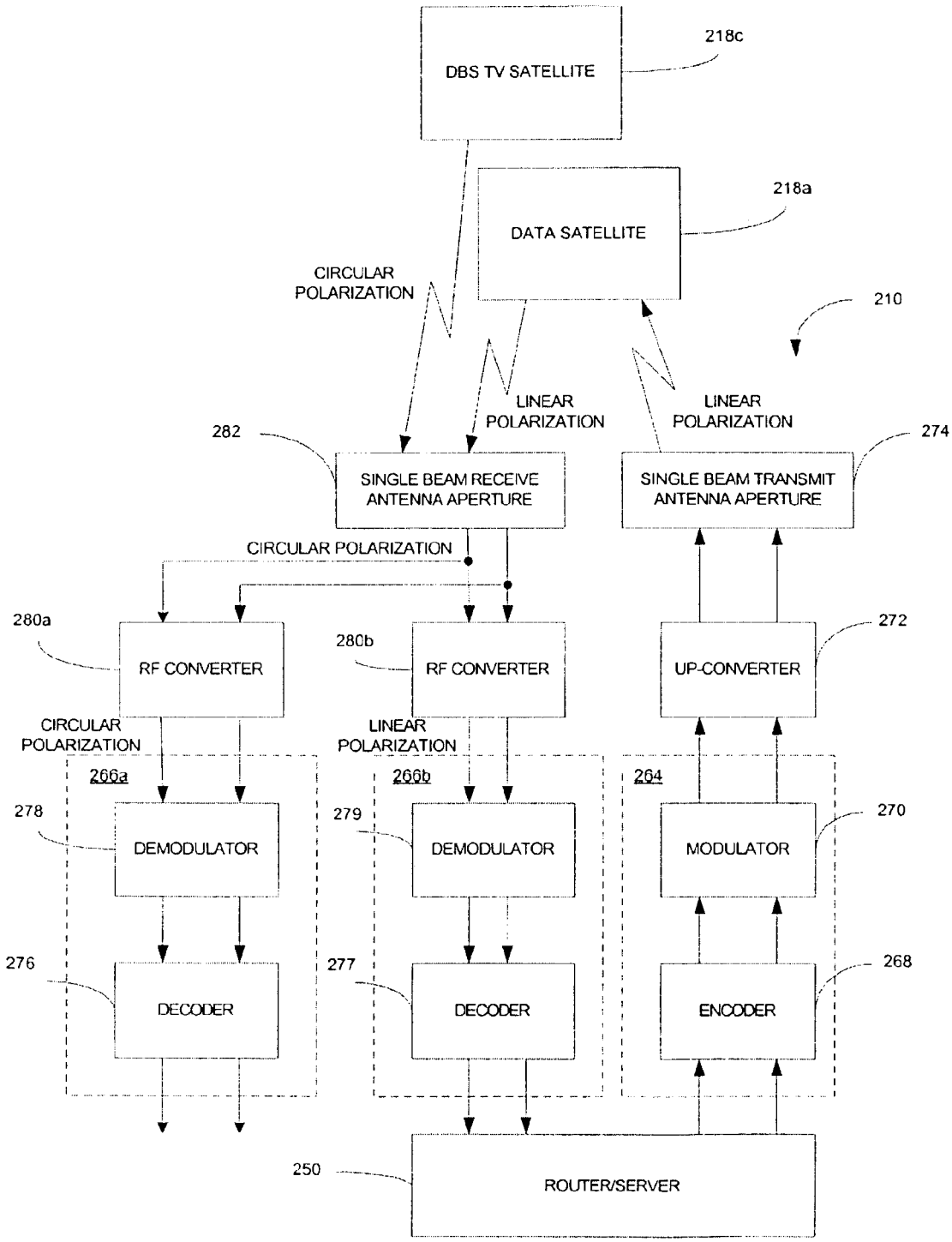
FIG. 3 is a block diagram of a feature of the mobile system for providing simultaneous live television and data services using a single beam antenna according to the present invention.

By way of overview, embodiments of the present invention provide an ability to simultaneously receive live television signals, such as DBS signals, and data signals on a mobile platform using a single beam receive antenna aperture and transmit data signals from a mobile platform using a single beam transmit antenna aperture. Referring briefly to FIG. 3 for an overview, in an exemplary, non-limiting embodiment of the present invention a single beam receive antenna aperture 282 receives DBS signals having circular polarization and data signals having linear polarization. The single beam receive antenna aperture 282 outputs output signals having linear polarization. A first RF converter 280a down-converts the output signals to first down-converted signals having circular polarization. A second RF converter 280b down-converts the output signals to second down-converted signals having linear polarization.

Exemplary embodiments of the present invention will be described in greater detail below. However, to provide a non-limiting context for understanding the present invention, an exemplary, non-limiting host environment is explained in which embodiments of the present invention are suitably implemented.

Exemplary Host Environment

Figure 1:
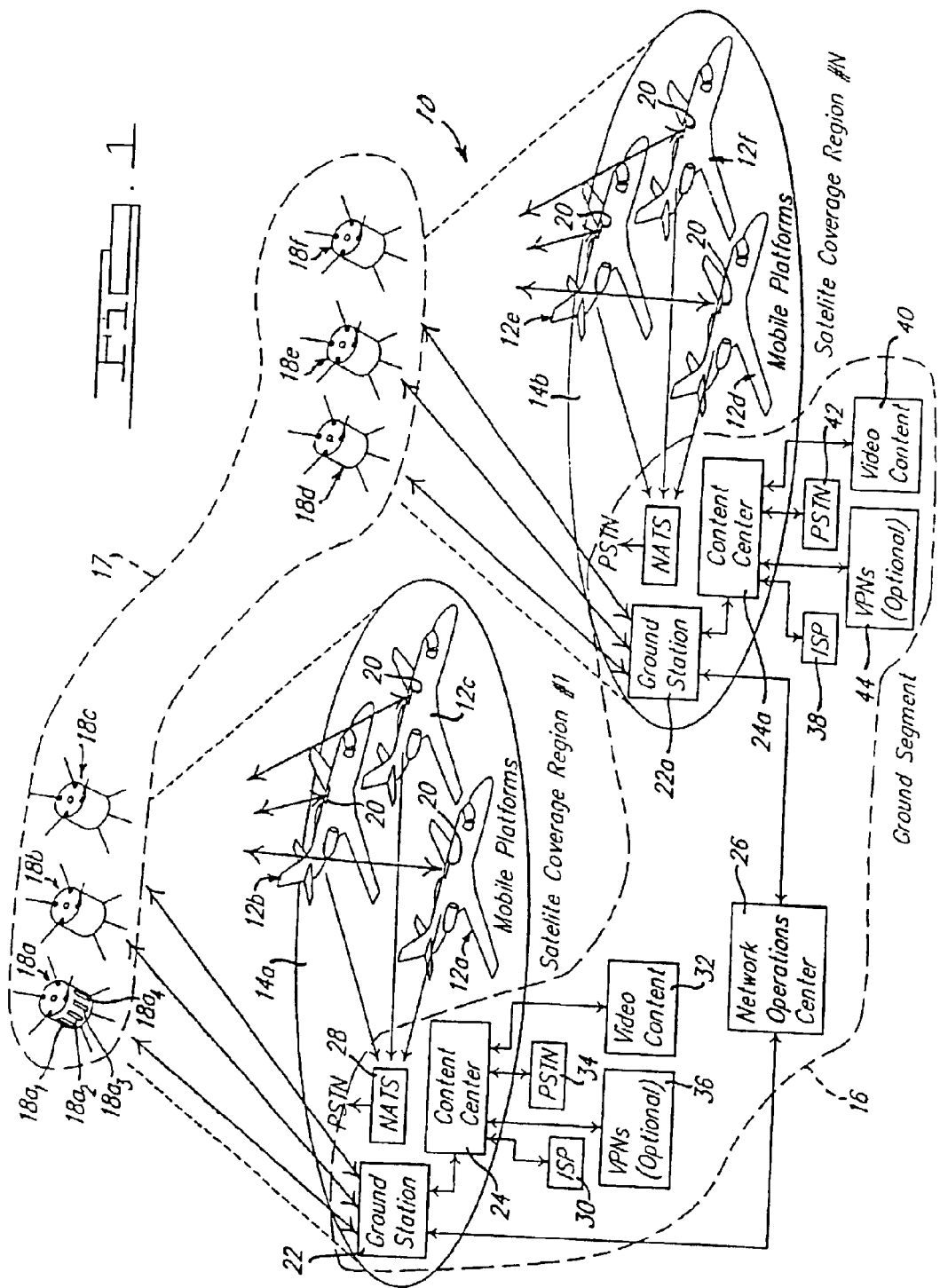
FIG. 1 is a simplified block diagram illustrating three major components of a system suitably incorporating the present invention.

Referring now to FIG. 1, there is shown a system 10 for providing data content to and from a plurality of mobile platforms 12a-12f in one or more distinct coverage regions 14a and 14b and that provides an exemplary host environment in which embodiments of the present invention are suitably implemented. The system 10 generally includes a ground segment 16, a plurality of satellites 18a-18f forming a space segment 17, and a mobile system 20 disposed on each moving platform 12. The mobile platforms 12 could include aircraft, cruise ships or any other moving vehicle. Thus, the illustration of the mobile platforms 12 as aircraft in the figures herein, and the reference to the mobile platforms as aircraft throughout the following description should not be construed as limiting the applicability of the system 10 to only aircraft.

The space segment 17 may include any number of satellites 18 in each coverage region 14a and 14b needed to provide coverage for each region. Satellites 18a, 18b, 18d and 18e are preferably Ku or Ka-band satellites. Satellites 18c and 18f are Broadcast Satellite Services (BSS) satellites. Each of the satellites 18 are further located in a geostationary orbit (GSO) or a non-geostationary orbit (NGSO). Examples of possible NGSO orbits that could be used with this system include low Earth orbit (LEO), medium Earth orbit (MEO) and highly elliptical orbit (HEO). Each of the satellites 18 includes at least one radio frequency (RF) transponder, and more preferably a plurality of RF transponders. For example satellite 18a is illustrated having four transponders $18a_1$-$18a_4$. It will be appreciated that each other satellite 18 illustrated could have a greater or lesser plurality of RF transponders as required to handle the anticipated number of mobile platforms 12 operating in the coverage area. The transponders provide "bent-pipe" communications between the aircraft 12 and the ground segment 16. The frequency bands used for these communication links could comprise any radio frequency band from approximately 10 MHz to 100 GHz. The transponders preferably comprise Ku-band transponders in the frequency band designated by the Federal Communications Commission (FCC) and the International Telecommunications Union (ITU) for fixed satellite services FSS or BSS satellites. Also, different types of transponders may be employed (i.e., each satellite 18 need not include a plurality of identical types of transponders) and each transponder may operate at a different frequency. Each of the transponders $18a_1$-$18a_4$ further include wide geographic coverage, high effective isotropic radiated power (EIRP) and high gain/noise temperature (G/T).

Regulatory authorities have assigned BSS satellites and FSS satellites to certain key orbital locations in the geosynchronous belt. The BSS frequencies carry DBS TV services and the FSS frequencies carry data services. In North America, the BSS broadcasts use circular polarization and the FSS frequencies use linear polarization. The BSS band uses different frequencies than the FSS band. If desired, a BSS satellite and an FSS satellite may be co-located in a same geostationary orbit slot. To avoid a collision, the actual orbital location of a BSS satellite and an FSS satellite are not in exactly a same orbital position. However, a single beam receive antenna aperture's bandwidth includes both of the co-located BSS and FSS satellites while looking at the same orbital location.

With further reference to FIG. 1, the ground segment 16 includes a ground station 22 in bi-directional communication with a content center 24 and a network operations center (NOC) 26. A second ground station 22a located in the second coverage area 14b may be used if more than one distinct coverage area is required for the service. In this instance, ground station 22a would also be in bi-directional communication with the NOC 26 via a terrestrial ground link or any other suitable means for establishing a communication link with the NOC 26. The ground station 22a would also be in bi-directional communication with a content center 24a. For the purpose of discussion, the system 10 will be described with respect to the operations occurring in coverage region 14a. However, it will be understood that identical operations relative to the satellites 18d-18f occur in coverage region 14b. It will also be understood that the system may be scaled to any number of coverage regions 14 in the manner just described.

The ground station 22 comprises an antenna and associated antenna control electronics needed for transmitting data content to the satellites 18a and 18b. The antenna of the ground station 22 may also be used to receive data content transponded by the transponders $18a_1$-$18a_4$ originating from each mobile system 20 of each aircraft 12 within the coverage region 14a. The ground station 22 may be located anywhere within the coverage region 14a. Similarly, ground station 22a, if incorporated, can be located anywhere within the second coverage area 14b. The content center 24 is in communication with a variety of external data content providers and controls the transmission of video and data information received by it to the ground station 22. Preferably, the content center 24 is in contact with an Internet service provider (ISP) 30, a video content source 32 and a public switched telephone network (PSTN) 34. Optionally, the content center 24 can also communicate with one or more virtual private networks (VPNs) 36. The ISP provides Internet access to each of the occupants of each aircraft 12. The video content source 32 provides rebroadcast television programming, for example, Cable News Network® (CNN) and ESPN®. The NOC 26 performs traditional network management, user authentication, accounting, customer service and billing tasks. The content center 24a associated with the ground station 22a in the second coverage region 14b would also preferably be in communication with an ISP 38, a video content provider 40, a PSTN 42, and optionally a VPN 44. An optional air telephone system 28 may also be included as an alternative to the satellite return link.

Figure 2:
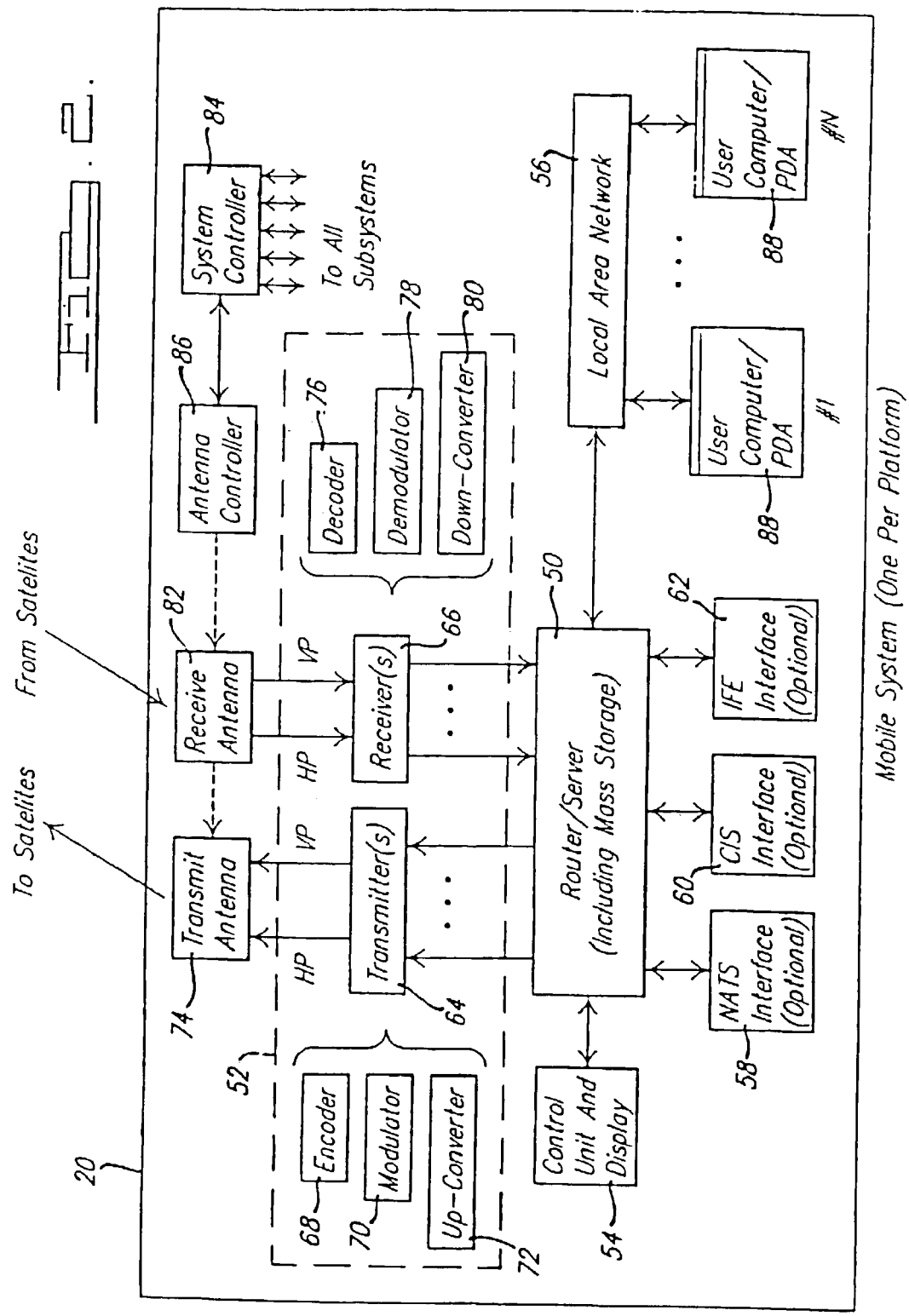
FIG. 2 is a block diagram of the mobile system carried on each mobile platform.

Referring now to FIG. 2, the mobile system 20 disposed on each aircraft 12 will be described in greater detail. Each mobile system 20 includes a data content management system in the form of a router/server 50 (hereinafter "server") which is in communication with a communications subsystem 52, a control unit and display system 54, and a distribution system in the form of a local area network (LAN) 56. Optionally, the server 50 can also be configured for operation in connection with a National Air Telephone System (NATS) 58, a crew information services system 60 and/or an in-flight entertainment system (IFE) 62.

The communications subsystem 52 includes a transmitter subsystem 64 and a receiver subsystem 66. The transmitter subsystem 64 includes an encoder 68, a modulator 70 and an up-converter 72 for encoding, modulating and up-converting data content signals from the server 50 to a transmit antenna 74. The receiver subsystem 66 includes a decoder 76, a demodulator 78 and an RF converter 80 for decoding, demodulating and down-converting signals received by the receive antenna 82 into baseband video and audio signals, as well as data signals. While only one receiver subsystem 66 is shown, it will be appreciated that preferably a plurality of receiver subsystems 66 will typically be included to enable simultaneous reception of RF signals from a plurality of RF transponders. If a plurality of receiver subsystems 66 are shown, then a corresponding plurality of components 76-80 will also be required.

The signals received by the receiver subsystem 66 are then input to the server 50. A system controller 84 is used to control all subsystems of the mobile system 20. The system controller 84, in particular, provides signals to an antenna controller 86 which is used to electronically steer the receive antenna 82 to maintain the receive antenna pointed at a particular one of the satellites 18, which will hereinafter be referred to as the "target" satellite. The transmit antenna 74 is slaved to the receive antenna 82 such that it also tracks the target satellite 18. It will be appreciated that some types of mobile antennas may transmit and receive from the same aperture. In this case the transmit antenna 74 and the receive antenna 82 are combined into a single antenna.

With further reference to FIG. 2, the local area network (LAN) 56 is used to interface the server 50 to a plurality of access stations 88 associated with each seat location on board the aircraft 12a. Each access station 88 can be used to interface the server 50 directly with a user's laptop computer, personal digital assistant (PDA) or other personal computing device of the user. The access stations 88 could also each comprise a seat back mounted computer/display. The LAN 56 enables bi-directional communication of data between the user's computing device and the server 50 such that each user is able to request a desired channel of television programming, access a desired website, access his/her email, or perform a wide variety of other tasks independently of the other users on board the aircraft 12.

The receive and transmit antennas 82 and 74, respectively, may comprise any form of steerable antenna. In one preferred form, these antennas comprise electronically scanned, phased array antennas. Phased array antennas are especially well suited for aviation applications where aerodynamic drag is important considerations. One particular form of electronically scanned, phased array antenna suitable for use with the system is disclosed in U.S. Pat. No. 5,886,671, assigned to The Boeing Co.

Referring further to FIG. 1, in operation of the system 10, the data content is preferably formatted into Internet protocol (IP) packets before being transmitted by either the ground station 22, or from the transmit antenna 74 of each mobile system 20. For the purpose of discussion, a transmission of data content in the form of IP packets from the ground station 22 will be referred to as a "forward link" transmission. IP packet multiplexing is also preferably employed such that data content can be provided simultaneously to each of the aircraft 12 operating within the coverage region 14a using unicast, multicast and broadcast transmissions.

The IP data content packets received by each of the transponders $18a_1$-$18a_4$ are then transponded by the transponders to each aircraft 12 operating within the coverage region 14a. While multiple satellites 18 are illustrated over coverage region 14a, it will be appreciated that at the present time, a single satellite is capable of providing coverage to an area encompassing the entire continental United States. Thus, depending upon the geographic size of the coverage region and the mobile platform traffic anticipated within the region, it is possible that only a single satellite incorporating a single transponder may be needed to provide coverage for the entire region. Other distinct coverage regions besides the continental United States include Europe, South/Central America, East Asia, Middle East, North Atlantic, etc. It is anticipated that in service regions larger than the continental United States, that a plurality of satellites 18 each incorporating one or more transponders may be required to provide complete coverage of the region.

The receive antenna 82 and transmit antenna 74 are each preferably disposed on the top of the fuselage of their associated aircraft 18. The receive antenna 74 of each aircraft receives the entire RF transmission of encoded RF signals representing the IP data content packets from at least one of the transponders $18a_1$-$18a_4$. The receive antenna 82 receives horizontally polarized (UP) and vertically polarized (VP) signals which are input to at least one of the receivers 66. If more than one receiver 66 is incorporated, then one will be designated for use with a particular transponder $18a_1$-$18a_4$ carried by the target satellite 18 to which it is pointed. The receiver 66 decodes, demodulates and down-converts the encoded RF signals to produce video and audio signals, as well as data signals, that are input to the server 50. The server 50 operates to filter off and discard any data content not intended for users on the aircraft 12a and then forwards the remaining data content via the LAN 56 to the appropriate access stations 88. In this manner, each user receives only that portion of the programming or other information previously requested by the user. Accordingly, each user is free to request and receive desired channels of programming, access email, access the Internet and perform other data transfer operations independently of all other users on the aircraft 12a.

Advantageously, the system 10 is also capable of receiving DBS transmissions of live television programming (e.g., news, sports, weather, entertainment, etc.). Examples of DBS service providers include DirecTV® and Echostar®. DBS transmissions occur in a frequency band designated for broadcast satellite services (BSS) and are typically circularly polarized in North America. Therefore, a linear polarization converter may be optionally added to receive antenna 82 for receiving broadcast satellite services in North America. The FSS frequency band that carries the data services and the BSS frequency band that carries DBS transmissions are adjacent to each other in the Ku-band. In one optional embodiment of the system 10, a single Ku-band receive antenna can be used to receive either DBS transmissions from DBS satellites 18c and 18f in the BSS band or data services in the FSS band from one of the FSS satellites 18a or 18b, or both simultaneously using the same receive antenna 82. According to the present invention, simultaneous reception from multiple satellites 18 is accomplished using a multi-beam receive antenna 82 or by using a single beam receive antenna 82 with satellites co-located in the same geostationary orbit slot.

It will be appreciated that the description provided above regarding the system 10 is directed to an exemplary host environment in which the present invention is suitably implemented. The following description is directed to an exemplary, non-limiting embodiment of the present invention.

Simultaneous Live Television and Data Services Using a Single Antenna Aperture

Referring now to FIG. 3, an exemplary embodiment of the present invention given by way of non-limiting example is shown of a system 210 for simultaneously receiving on a mobile platform DBS signals from a DBS TV satellite 218c and data signals from a co-located data satellite 218a using a single beam receive antenna aperture 282 and transmitting data signals to the data satellite 218a from the mobile platform using a single beam transmit antenna aperture 274. It will be appreciated that details of components of the system 210 are suitably the same as details of the system 10 discussed above and are therefore not repeated in the discussion of the system 210.

The DBS TV satellite 218c is suitably a BSS satellite located in a geostationary orbital location. The data satellite 218a is suitably an FSS satellite that is co-located in the same geostationary orbit slot with the DBS TV satellite 218c. The DBS TV satellite transmits RF signals having circular polarization. The data satellite 218a transmits and receives RF signals having linear polarization.

The single beam receive antenna aperture 282 suitably includes any acceptable receive antenna aperture arranged to receive RF signals from the DBS TV satellite 218c and the data satellite 218a. The single beam transmit antenna aperture 274 suitably includes any acceptable transmit antenna aperture arranged to transmit RF signals to the data satellite 218a. Advantageously, the single beam receive antenna aperture 282 receives circularly polarized RF signals from the orbital location. The instantaneous receive bandwidth of the single beam receive antenna aperture 282 suitably includes all of the spectrum (that is, all of the transponders) assigned to the BSS band to enable selection of all of the DBS TV content available from the DBS service provider while also receiving a portion of the FSS band spectrum. As a result, two conditions are entailed for selecting the data satellite 218a and its transponder. First, the data satellite 218a is acceptably co-located with a DBS TV satellite 218c. Second, the selected FSS transponder of the data satellite 218a is sufficiently close to the BSS band to fall within the portion of the FSS band included in the instantaneous receive bandwidth of the single beam receive antenna aperture 282.

It will be appreciated that the single beam receive antenna aperture 282 and the single beam transmit antenna aperture 274 may be provided within a same antenna or may be provided as separate antennas, as desired for a particular application. It will also be appreciated that the single beam receive antenna aperture 282 and the single beam transmit antenna aperture 274 may be implemented with any acceptable type of antenna as desired for a particular application. For example, the single beam receive antenna aperture 282 and the single beam transmit antenna aperture 274 may be implemented with a phased array antenna, such as an electronically scanned phased array antenna or a mechanically scanned phased array antenna. Alternately, the single beam receive antenna aperture 282 and the single beam transmit antenna aperture 274 may be implemented with a reflector antenna, if desired.

Received DBS TV signals are processed as follows. The single beam receive antenna aperture 282 outputs circularly polarized signals to an RF converter 280a. The RF converter 280a down-converts the received frequency band from a high band to a lower band compatible for reception by DBS TV receivers. The RF converter 280a outputs circularly polarized, down-converted signals to a receiver subsystem 266a. The receiver subsystem 266a includes a demodulator 278 that demodulates the down-converted signals from the RF converter 280a and a decoder 276 that decodes the demodulated signals from the demodulator 278. The decoded signals from the decoder 276 are then provided for further processing as desired for viewing TV programming.

Received data signals are processed as follows. The single beam receive antenna aperture 282 also outputs the circularly polarized signals to an RF converter 280b. The RF converter 280b is similar to the RF converter 280a. As such, the RF converter 280b down-converts the received frequency band from a high band to a lower band compatible for reception by data receivers. However, in addition the R-F converter 280b also advantageously converts the circularly polarized signals to linearly polarized signals. By providing the RF converter 280b in addition to the RF converter 280a, the system 210 is advantageously able to simultaneously receive (with the single beam receive antenna aperture 282) and process DBS TV signals and data signals from the co-located DBS TV and data satellites 218c and 218a, respectively. The RF converter 280b outputs linearly polarized, down-converted signals to a receiver subsystem 266b. The receiver subsystem 266b includes a demodulator 279 that demodulates the down-converted signals from the RF converter 280b and a decoder 277 that decodes the demodulated signals from the demodulator 279. The decoded signals from the decoder 277 are then provided to a router/server 250 for further processing as desired for data services.

Data signals are transmitted as follows. Data signals are provided by the router/server 250 to a transmitter subsystem 264 that includes an encoder 268 that encodes the data signals from the router/server 250 and a modulator 270 that modulates the encoded signals from the encoder 268. An up-converter 272 up-converts the modulated signals from the modulator 270 and provides the up-converted signals to the single beam transmit antenna aperture 274. The single beam transmit antenna aperture transmits linearly polarized RF signals to the data satellite 218a.

Rebroadcast television or customized video services are received and processed by the mobile system 20 in the same way as live television. Rebroadcast or customized video content is obtained from the video content source 32 and transmitted via the ground station 22 to the FSS satellites 18a and 18b. The video content is appropriately encoded for transmission by the content center 24 before being broadcast by the ground station 22. Some customization of the rebroadcast content may occur on the server 50 (FIG. 2) of the mobile system 20 to tailor advertisements and other information content to a particular market or interest of the users on the aircraft 12a.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A system for simultaneously receiving on a mobile platform first RF signals having a circular polarization from a first satellite at an orbital location and second RF signals having a linear polarization from a second satellite that is substantially co-located in a same geostationary orbit slot with the first satellite; the system comprising:

a single beam receive antenna aperture arranged to receive first RF signals having a circular polarization and providing a first service from a first satellite at an orbital location and second RF signals having a linear polarization and providing a second service different than the first service from a second satellite that is substantially co-located in a same geostationary orbit slot with the first satellite, the single beam receive antenna aperture outputting output signals having the circular polarization;

a first RF converter arranged to down-convert the output signals to first down-converted signals having the circular polarization; and a second RF converter arranged to down-convert the output signals to second down-converted signals having the linear polarization.

2. The system of claim 1, further comprising:
a first receiver arranged to demodulate and decode the first down-converted signals to first baseband signals; and
a second receiver arranged to demodulate and decode the second down-converted signals to second baseband signals.

3. The system of claim 2, wherein the first baseband signals include video signals.

4. The system of claim 2, wherein the second baseband signals include data signals.

5. The system of claim 1, further comprising:
an up-converter arranged to up-convert third signals to third up-converted signals; and
a single beam transmit antenna aperture arranged to receive the third up-converted signals, the single beam transmit antenna aperture transmitting third RF signals having the linear polarization.

6. The system of claim 5, further comprising a transmitter arranged to encode and modulate data transmission signals to the third signals.

7. The system of claim 1, wherein the first RF signals include DBS signals.

8. The system of claim 1, wherein the second RF signals include data services signals.

9. The system of claim 1, wherein the mobile platform includes an aircraft.

10. A system for simultaneously receiving on a mobile platform first RF signals having a circular polarization from a first satellite at an orbital location and second RF signals having a linear polarization from a second satellite that is substantially co- located in a same geostationary orbit slot with the first satellite and for transmitting third RF signals having the linear polarization to the second satellite, the system comprising:
a single beam receive antenna aperture arranged to receive first RF signals having a circular polarization and providing television service from a first satellite at an orbital location and second RF signals having a linear polarization and providing data service from a second satellite that is substantially co-located in a same geostationary orbit slot with the first satellite, the single beam receive antenna aperture outputting output signals having the circular polarization;
a first RF converter arranged to down-convert the output signals to first down-converted signals having the circular polarization;
a first receiver arranged to demodulate and decode the first down-converted signals to first baseband signals;
a second RF converter arranged to down-convert the output signals to second down-converted signals having the linear polarization;
a second receiver arranged to demodulate and decode the second down-converted signals to second baseband signals;
a transmitter arranged to encode and modulate data transmission signals to third signals;
an up-converter arranged to up-convert the third signals to third up-converted signals; and
a single beam transmit antenna aperture arranged to receive the third up-converted signals, the single beam transmit antenna transmitting third RF signals having the linear polarization.

11. The system of claim 10, wherein the mobile platform includes an aircraft.

12. A method for simultaneously receiving on a mobile platform first RF signals having a circular polarization from a first satellite at an orbital location and second RF signals having a linear polarization from a second satellite that is substantially co- located in a same geostationary orbit slot with the first satellite, the method comprising:
receiving with a single beam receive antenna aperture first RF signals having a circular polarization from a first satellite at an orbital location and second RF signals having a linear polarization from a second satellite that is substantially co-located in a same geostationary orbit slot with the first satellite;
outputting from the single beam receive antenna aperture output signals having the circular polarization;
down-converting the output signals to first down-converted signals having the circular polarization; and
down-converting the output signals to second down-converted signals having the linear polarization.

13. The method of claim 12, further comprising:
demodulating and decoding the first down-converted signals to first baseband signals; and
demodulating and decoding the second down-converted signals to second baseband signals.

14. The method of claim 13, wherein the first baseband signals include video signals.

15. The method of claim 13, wherein the second baseband signals include data signals.

16. The method of claim 12, further comprising:
up-converting third signals to third up-converted signals;
providing the third up-converted signals to a single beam transmit antenna aperture; and
transmitting from the single beam transmit antenna aperture third RF signals having the linear polarization.

17. The method of claim 16, further comprising encoding and modulating data transmission signals to the third signals.

18. The method of claim 12, wherein the first RF signals include DBS signals.

19. The method of claim 12, wherein the second RF signals include data services signals.

20. The method of claim 12, wherein the mobile platform includes an aircraft.

21. An aircraft comprising:
a fuselage; and
a system for simultaneously receiving on a mobile platform first RF signals having a circular polarization and providing a first service from a first satellite at an orbital location and second RF signals having a linear polarization and providing a second service different than the first service from a second satellite that is substantially co-located in a same geostationary orbit slot with the first satellite, the system including:
a single beam receive antenna aperture mounted on the fuselage and arranged to receive first RF signals having a circular polarization from the first satellite at the orbital location and second RF signals having a linear polarization from the second satellite that is substantially co-located in a same geostationary orbit slot with the first satellite, the single beam receive antenna aperture outputting output signals having the circular polarization;
a first RF converter arranged to down-convert the output signals to first down-converted signals having the circular polarization; and
a second RF converter arranged to down-convert the output signals to second down-converted signals having the linear polarization.

22. The aircraft of claim 21, wherein the first RF signals include DBS signals.

23. The aircraft of claim 21, wherein the second RF signals include data services signals.

24. The aircraft of claim 21, further comprising a first receiver arranged to demodulate and decode the first down-converted signals to first baseband signals, wherein the first baseband signals include video signals.

25. The system of claim 24, further comprising a second receiver arranged to demodulate and decode the second down-converted signals to second baseband signals, wherein the second baseband signals include data signals.

* * * * *